United States Patent
Schafiyha et al.

(10) Patent No.: US 7,093,913 B2
(45) Date of Patent: Aug. 22, 2006

(54) TRACTION CONTROL METHOD FOR SLIPPING WHEELS OF AT LEAST ONE DRIVING AXLE

(75) Inventors: Schahrad Schafiyha, Kriffel (DE); Henning Raulfs, Bad Hamburg (DE); Carsten Dresch, Ludwigsburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 10/502,688

(22) PCT Filed: Jan. 14, 2003

(86) PCT No.: PCT/EP03/00248

§ 371 (c)(1), (2), (4) Date: Jan. 10, 2005

(87) PCT Pub. No.: WO03/064227

PCT Pub. Date: Aug. 7, 2003

(65) Prior Publication Data

US 2005/0116536 A1    Jun. 2, 2005

(30) Foreign Application Priority Data

Jan. 28, 2002    (DE) .............................. 102 03 422

(51) Int. Cl.
  *B60T 8/66*    (2006.01)
(52) U.S. Cl. ...................... 303/156; 303/158; 303/139; 303/DIG. 6; 180/197
(58) Field of Classification Search ................ 303/199, 303/DIG. 6, 113.2, 139, 140, 190, 143; 180/244–250, 180/197; 701/82, 84, 88, 71, 83, 90, 89; 477/83; 475/150, 35
See application file for complete search history.

(56) References Cited

U.S. PATENT DOCUMENTS

| | | | | |
|---|---|---|---|---|
| 4,671,373 A * | 6/1987 | Sigl | ............................ | 180/197 |
| 4,761,043 A * | 8/1988 | Wupper et al. | ............. | 303/190 |
| 4,962,970 A * | 10/1990 | Jonner et al. | ................ | 303/190 |
| 5,016,724 A * | 5/1991 | Steinhagen et al. | ......... | 180/197 |
| 5,419,622 A * | 5/1995 | Burg et al. | .................. | 303/139 |
| 5,544,949 A * | 8/1996 | Schmitt et al. | ............. | 303/140 |

(Continued)

FOREIGN PATENT DOCUMENTS

DE    32 34 282 A1    3/1984

(Continued)

OTHER PUBLICATIONS

German Search Report of Application No. 102 03 422.2 dated Sep. 19, 2002.

(Continued)

*Primary Examiner*—James McClellan
*Assistant Examiner*—Mariano Sy
(74) *Attorney, Agent, or Firm*—RatnerPrestia

(57) ABSTRACT

The present invention relates to a method for traction control of slipping wheels of at least one driving axle, which are driven by way of an open differential gear and can be interlocked by braking intervention to a defined, predeterminable degree for effecting a differential lock function. The invention discloses that the wheel slip of the wheels is detected, that the detected wheel slip variation is compared with predetermined wheel slip patterns for recognizing and monitoring a current driving condition, and that a braking intervention effecting the differential lock function is performed when the sensed wheel slip variation coincides with at least one predetermined wheel slip pattern. The invention allows an accelerated adjustment and control of a differential lock effect depending on the respective driving condition.

13 Claims, 1 Drawing Sheet

U.S. PATENT DOCUMENTS

| | | |
|---|---|---|
| 5,719,770 A | 2/1998 | Matsuno |
| 5,802,489 A * | 9/1998 | Orbach et al. ............... 701/50 |
| 6,584,398 B1 * | 6/2003 | Erban ........................ 701/82 |

FOREIGN PATENT DOCUMENTS

| | | |
|---|---|---|
| DE | 34 21 776 C2 | 12/1984 |
| DE | 37 21 628 C2 | 1/1988 |
| DE | 39 32 567 A1 | 4/1991 |
| DE | 44 18 773 C1 | 1/1996 |
| DE | 44 33 459 A1 | 3/1996 |
| DE | 197 22 054 A1 | 12/1998 |
| DE | 198 58 815 A1 | 7/1999 |
| DE | 199 13 824 A1 | 9/2000 |
| DE | 199 53 773 A1 | 9/2000 |
| DE | 100 50 173 A1 | 4/2001 |
| DE | 199 50 304 A1 | 5/2001 |

OTHER PUBLICATIONS

International Search Report of International Application No. PCT/EP03/00248 dated Jun. 24, 2003.

* cited by examiner

TRACTION CONTROL METHOD FOR SLIPPING WHEELS OF AT LEAST ONE DRIVING AXLE

TECHNICAL FIELD

The present invention relates to a traction control method for slipping wheels of at least one driving axle, which are driven by way of an open differential gear and can be interlocked by means of braking intervention to a defined, predeterminable degree for effecting a differential lock function.

BACKGROUND OF THE INVENTION

To avoid the spinning of driving wheels, it is known in traction control to arrange for an intervention into the wheel brake and, as the case may be, additional intervention into engine management. The wheel brake intervention is executed on wheels subjected to traction slip and permits a differential lock effect. This procedure is based on the consideration of decelerating the wheel subjected to traction slip by way of a defined brake torque to achieve a rotational speed with a favorable predetermined traction slip so that using an open differential gear allows the brake torque generated on one side to be available as an additional drive torque at the other, opposite wheel. Details can be taken from the technical book 'Fahrsicherheitssysteme' (Driving Safety Systems), second edition Vieweg 1998, page 75 sqq.

DE 34 21 776 C2 discloses a vehicle with all-wheel drive, wherein the wheels of an axle are connected to the drive shaft and the drive shafts are connected to the driving motor by way of differential gears. An electronic differential lock effect is achieved by introducing a braking pressure on each individual wheel subjected to traction slip. More specifically, braking irrespective of the driver will take place with a corresponding brake torque when traction slip is detected, with a view to reducing the effective drive torque at the spinning wheel. The dosing and modulation of the brake torque is based on slip control on each individual wheel.

A traction control method for use with open differentials is known from the technical journal ATZ 102(2000) No. 9, pages 764–773, wherein, like in anti-lock control, it is detected by evaluation of wheel speed signals whether the wheels are still in a predetermined slip range. During traction control, braking intervention is effected on wheels that exceed the slip threshold. An active braking pressure build-up can prevent a high degree of traction slip on respectively diagonally opposite driving wheels.

A method of detecting so-called axle twist conditions with diagonally opposite slipping driving wheels is disclosed in DE 199 53 773 A1. No hint can be taken from this publication to carry out a detection of driving conditions beyond axle twist conditions.

BRIEF SUMMARY OF THE INVENTION

An object of the invention involves improving the prior art control methods with an open differential in such a fashion that an accelerated adjustment and control of the differential lock effect is rendered possible in dependence on the respective driving condition including the prevailing states of driving (coefficient-of-friction situation).

This object is achieved by the features of the described traction control method in that the wheel slip of the wheels is sensed, that a sensed wheel slip variation is compared with predetermined wheel slip patterns for detecting and monitoring a current driving condition, and that a braking intervention effecting the differential lock function is performed when the sensed wheel slip variation is coincident with at least one predetermined wheel slip pattern.

The invention is based on a method for traction control of slipping wheels of at least one driving axle which are driven by way of an open differential gear and can be interlocked by means of braking intervention to a defined, predeterminable degree for effecting a differential lock function. The wheel slip of the wheels is sensed, a sensed wheel slip variation is compared with predetermined wheel slip patterns for detecting and monitoring a current driving condition, and a braking intervention effecting the differential lock function is performed when the sensed wheel slip variation is coincident with at least one predetermined wheel slip pattern. The invention permits performing driving-condition-responsive braking interventions with a differential lock function by using reasonable effort. In driving situations where opposite driving wheels are slipping, the invention allows a quick and effective traction control.

For the quick control of the locking torque, an adaptive pressure reduction gradient or an adaptive pressure increase gradient is calculated on each individual wheel in dependence on the detected wheel slip pattern, and the pressure reduction or the pressure increase is realized by adapting pulse-pause valve actuation sequences.

Advantageously, a pause between two pressure reduction pulses or between two pressure increase pulses is found out on the basis of data relating to a vehicle reference speed, the wheel slip and, as the case may be, a constant base quantity. In addition, the slip behavior of the wheels can be monitored additively, and a progression or degression of a counter will occur in dependence on the slip behavior. A difference in torques between a current axle torque and a filtered axle torque and data relating to the rotational behavior of a driving engine can be considered to prevent stalling of the engine.

It has proven advantageous that the used electronic controller, preferably software-based, is based on a controller model with linear components (P-components), integrating components (I-components) and, as the case may be, differentiating components (D-components, delay elements), and the above-mentioned influences can be superimposed as disturbance variables.

A loss in traction is counteracted in an especially early fashion when the amplification factors ($k_{1-5}$, $k_p$, $k_d$) are determined each in dependence on the detected driving condition of the vehicle, and when the control threshold at the slipping wheel (pair) is lowered after detection of a driving condition with traction slip.

To render the differential lock function plausible, a test will be performed based on the vehicle reference speed and based on a cornering detection. If a differential lock does not appear plausible, it will be deactivated. Further, deactivation is performed when a driving condition is detected where all wheels are on a low coefficient of friction or when cornering prevails. Cornering detection can be carried out in a simple fashion by monitoring the steering angle.

According to a favorable aspect of the invention, a traction control strategy based on wheel-individual slip values is possible and provided in addition to the traction control strategy based on identified driving conditions, and the control is performed on the basis of wheel-individual slip values when the differential lock function was deactivated, in particular when a driving condition was detected where all wheels adopt a low coefficient of friction.

To determine the vehicle reference speed free from traction control influences, the relating rotational data of traction-controlled wheels is not taken into account. When a traction control intervention prevails at all vehicle wheels, the driving wheel with the lowest locking torque (brake torque) due to traction control is taken into account for determining the vehicle reference speed.

BRIEF DESCRIPTION OF THE DRAWING

In the accompanying drawing, the only

BRIEF DESCRIPTION OF THE PREFERRED EMBODIMENTS

Figure 1:
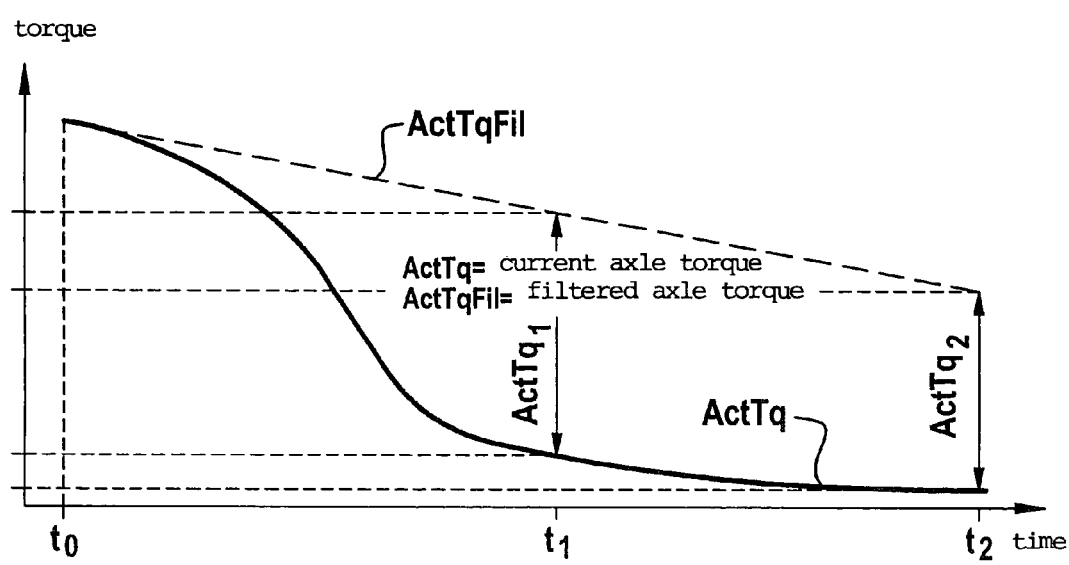
FIG. 1 is a schematic diagram for illustrating a difference between the current and the filtered axle torque.

The invention relates to a method for traction control of slipping wheels of at least one driving axle of a motor vehicle, which wheels are driven by way of an open differential gear and can be interlocked by means of braking intervention to a defined, predeterminable degree to effect a differential lock function. Principally, an all-wheel driven vehicle is equipped with a transverse differential gear between the wheels of a driving axle. A longitudinal differential gear is interposed in a connection between two different driving axles. Open differential gears act as a torque balance, and the respective output speed is conformed to the conditions. Different wheel speeds of the inside wheel in a turn and the outside wheel in a turn of one axle are realized during cornering, for example. It is self-explanatory that engine control intervention is possible in addition to braking intervention. Engine control interventions are considered as principally known and, therefore, do not need any further explanation.

Different driving situations can be encountered with all-wheel driven vehicles—mainly when starting to drive or when driving on roadways with different coefficients of friction, on rough road sections or in off-road operations—which can be recognized by way of the wheel slip variation (plotted as a function of time). Further, special cases are feasible such as conditions with abrupt μ changes, with one or both wheels of an axle on a low coefficient of friction (LM) and the wheels of the other axle on a high coefficient of friction (HM). Besides, μ-split situations are possible, where the wheels of one vehicle side are confronted with a high coefficient of friction and the wheels of the other vehicle side are confronted with a low coefficient of friction. In addition, mixed and special forms are feasible if, for example, the introduced engine torque cannot be applied e.g. due to lifted wheels or wheels greatly relieved from vertical forces, for example in axle twists or on loose underground at individual or all driven spinning wheels so that no propulsion is produced. It is therefore known to build up a locking torque (brake torque) on slipping wheels, which are unable to transmit a driving torque, by means of a braking pressure buildup irrespective of the driver so that the driving torque can be transmitted by driving wheels, which are not slipping at all or are slipping to a lower degree.

When the term 'slip' has been referred to hereinabove, basically the brake slip measured by way of wheel speed sensors was meant which can principally adopt values between 0% (freely rolling) and 100% (locked). According to the above terminology, brake slip—in contrast to traction slip—has a negative sign. The measured slip can be positive in the course of a traction control intervention when temporarily traction slip occurs again, e.g. after a first control cycle.

To adapt traction control to the mentioned driving conditions and, in particular, adjust an adaptive differential lock rate with a defined locking torque, 'adaptive' meaning adapted to conditions, the slip of the wheels is sensed, and the sensed wheel slip variation is compared with predetermined wheel slip patterns for detecting and monitoring a current driving condition. Only when the sensed wheel slip variation coincides with at least one predetermined wheel slip pattern will braking intervention with a defined differential lock function follow. More specifically, a defined locking rate is adjusted adaptively without a wheel-individual control according to a nominal slip being performed. When coincidence lacks, control according to a nominal slip will take place. Even if a threshold value in the form of an off-road counter is not exceeded, control according to the nominal slip will take place. The method is explained in more detail hereinbelow.

Wheel slip variations shall be classified as follows:

| | |
|---|---|
| no_wheel_or_three_wheels_ slipping | no obvious slip pattern or three wheels under traction control |
| one_wheel_slipping | one wheel under traction control |
| all_wheels_slipping | all wheels under traction control, all wheels on gravel, mud or low coefficient of friction - change to slip-based control ! |
| first_diagonal_slipping (wheels 1 + 3) | diagonally opposite left front and right rear wheels under traction control |
| second_diagonal_slipping (wheels 2 + 4) | diagonally opposite right front and left rear wheels under traction control |
| front axle_slipping | abrupt μ-change situation, only the wheels of the front axle under traction control |
| rear axle_slipping | abrupt μ-change situation, only the wheels of the rear axle under traction control |
| left_wheels_slipping | μ-split situation, wheels of the left side on low-μ |
| right_wheels_slipping | μ-split situation, wheels of the right side on low-μ |

The following operations are performed on each individual wheel. Individual counters summing counted values (stability counters, LM-counters (for a low coefficient-of-friction situation)) are associated with each vehicle wheel. Each of the above-mentioned driving conditions exhibits defined, predetermined counted values so that the driving conditions can be recognized from the counts of the counters. When a defined count (control threshold) within the respective monitoring period is exceeded, the differential lock function is performed on the basis of individually (adaptively) determined amplification factors. Otherwise, the differential lock function is canceled. The differential lock function is also canceled in the event of unplausibility. A counting method for diagonally offset slipping wheels can be taken from DE 199 53 773 A1. The respective disclosure is referred to in full extent for detecting different driving conditions.

The state of plausibility is achieved as follows. A poll is made whether cornering exists or is desired by the vehicle operator. This can e.g. be done in that cornering is measured by way of the prevailing lateral acceleration directly by means of a lateral acceleration sensor. The steering angle can be measured according to another variant, and a functional interrelation between the existing steering angle and the lateral acceleration is used for cornering detection. It is finally possible to calculate the lateral acceleration from the relation $$a_y = \frac{SWA * v_{Ref}^2}{l} \text{ where}$$

SWA: steering angle
$v_{Ref}$: vehicle reference speed
l: center distance.

When cornering is detected, the locking rate control is canceled. Further, the locking rate control is deactivated when it is detected that all driving wheels exhibit a low coefficient of friction. The locking rate control is also deactivated when it is detected e.g. on the basis of a brake light switch signal that brake application by the driver prevails. A control on the basis of predetermined slip values takes place for these cases.

As stated hereinabove, an adaptive (differential) locking rate control with a locking torque modulation (brake torque modulation) on the basis of individually determined controller amplification factors (k values) is executed in dependence on the detected driving condition. The driving conditions or wheel slip patterns are determined by logical evaluation of the control phases or the wheel slip variation of the individual wheels because it is evaluated how many wheels have exceeded a control threshold (slip threshold) within the predetermined monitoring period, and which is the arrangement of the wheels relative one another. This driving condition monitoring is effected continuously in order to react to condition variations.

The adaptive control of the locking torque (wheel brake torque) is carried out for each individual wheel by way of a pressure increase gradient or pressure reduction gradient in dependence on the wheel slip pattern e.g. determined according to the above table. As the requirement may be, pressure increase or pressure reduction is realized by the adaptation of pulse-pause valve actuation sequences. Practically, it is a matter of increasing or reducing the braking pressure adjusted on a slipping wheel, delayed or boosted in a defined fashion.

A period of a pause between two successive pulses relating to the pressure reduction is described by $$\Delta T = T_B - k_1 * v_{ref} + k_2 * \lambda_{fil} - k_3 * Stab_{counter} - k_4 * \Delta ActTq - k_5 * [k_p * (N_{nom} - N) + k_d * \Delta N]$$

where
$T_B$: base quantity
$k_1, k_2, k_3, k_4, k_5, k_p, k_d$ amplification factors
$v_{ref}$ vehicle reference speed $$\lambda_{fil}: \text{ brake slip (filtered)} = \frac{v_{ref} - v_{wheel}}{v_{ref}} * 100\%$$

$v_{wheel}$: wheel speed
$Stab_{counter}$: counter for monitoring the slip behavior (stability counter)
$\Delta ActTq$: $ActTq_{fil} - ActTq$
$ActTq_{fil}$: axle moment (filtered)
$ActTq$: axle moment (current)
$N_{nom}$: nominal engine speed
N: actual engine speed
$\Delta N$: engine speed variation.

When necessary, the intensity of a pulse, its amplitude, in particular a pressure increase gradient, can be adapted in dependence on the wheel behavior.

The controller with disturbance variable compensation comprises linear (P) components, integral (I) components and damped (D) components.

As can be seen in the above equation, a reduction phase is initially dependent on the constant base quantity $T_B$, and on the filtered wheel slip $\lambda_{fil}$ and the vehicle reference speed $v_{ref}$. A reduction of the pause time $\Delta T$ is provided (according to tendency) when the vehicle reference speed $v_{ref}$ rises, or the slip $\lambda_{fil}$ rises. Besides, the wheel slip behavior can be taken into account by way of the counter $Stab_{counter}$. The counter is raised when the measured slip $\lambda_{fil}$ lies within predetermined slip ranges, which define control thresholds above and below a vehicle reference. If this is not the case—when the slip values lie outside the slip ranges—the counter is reduced. This permits monitoring the inherent stability of allegedly tractionless wheels. It must be added that the control thresholds are lowered during a traction control operation for the wheels concerned. More specifically, the mentioned slip ranges are configured to be narrower in order to early counteract a loss in traction. When the control thresholds are exceeded after the decrease, there will be a wheel-individual pressure increase with a pressure increase gradient that is determined adaptively (on the basis of the currently prevailing conditions) in order to thereby redevelop the necessary locking torque and maintain the slip of tractionless wheels in the defined range around the driving speed.

The wheel torque difference $\Delta ActTq$ is provided as another superimposed disturbance variable. This variable considers a dynamic balance and a change in the balance between the currently output engine torque and the generated locking torque (brake torque) for the case that the current axle torque ActTq is lower than the filtered axle torque $ActTq_{fil}$. This variable renders it possible to influence the pause time for a pressure reduction as a function of the dynamics of the driving torque demanded by the driver. When the vehicle operator e.g. spontaneously reduces the demanded driving torque by releasing the accelerator, as is sketched in FIG. 1, $\Delta ActTq$ will prevail at a time $t_1$ contributing to an additional reduction of the pause time $\Delta T$. In contrast thereto, the pause time $\Delta T$ is influenced only slightly or not at all by gradually releasing the accelerator, because at a hypothetical time $t_2$ after releasing the accelerator at $t_0$, the value of $ActTq_{fil}$ has already significantly approached the value of ActTq due to a largely linearly declining characteristics. Consequently, the difference produced leads to a reduced influence on the pause time $\Delta T$.

It is particularly significant to monitor the engine rotational speed N while considering the rotational speed change in order to avoid stalling of the driving motor on account of a traction control intervention. Taking into account this control reserve is done on the basis of a PD control approach by way of corresponding amplification factors with a term, which is predominantly directed to weighting the difference between the nominal engine speed $N_{nom}$ and the actual engine speed N and to the detected change in engine speed $\Delta N$. As can be seen, a pause time $\Delta T$ for a pressure reduction is reduced when the actual engine speed N drops below the nominal engine speed $N_{nom}$. If the engine shows a stalling tendency nevertheless, the preset nominal slip is increased linearly and the pressure increase gradient reduced, as the case may be. In drastic cases it is possible to change into a traction control strategy on the basis of a nominal slip specification. In terms of a stalling protection, reference is made in this respect to DE 100 27 628 A1 which is included in its full scope.

As can be seen from the above equation, the influencing variables are subtracted from the base quantity $T_B$ in order to arrive at the pause time $\Delta T$. Also the quantity included by way of slip $\lambda_{fil}$ is subtracted from the base quantity $T_B$ due to its negative sign (brake slip appears with a negative sign during traction control).

In a preferred aspect of the invention, not only a traction control strategy based on detected driving conditions (adaptive locking rate control) but another traction control strategy based on wheel-individual slip values is provided. When the conditions for the driving condition strategy (adaptive locking rate control) do not prevail, said is deactivated, and switch-over is made to the traction control strategy based on the slip values $\lambda_{fil}$. It is self-explanatory that starting from the traction control strategy based on the slip values $\lambda_{fil}$ it is possible to switch back to a locking rate control when the off-road counter furnishes a corresponding result. To be able to quickly switch back into a traction control mode after its completion, it is advisable to shorten the monitoring time after completion of the previous traction control intervention.

Due to their principle, traction control interventions can have effects on the measured wheel slip $\lambda$ and, consequently, on the vehicle reference speed $v_{ref}$ determined therefrom. This is because the circumferential speed $v_{wheel}$ of an overbraked driving wheel in a traction control mode differs significantly from the circumferential speed of a wheel that rolls synchronously with the vehicle speed. A too low amount of vehicle reference speed $v_{ref}$ can be determined as a result. More specifically, a driving wheel that is overbraked due to a traction control intervention will reduce the vehicle reference speed, what may cause control errors. It is therefore arranged for that the rotational signals of traction-controlled driving wheels are not taken into account for determining the vehicle reference speed, and that on detection of a traction control intervention on all wheels the driving wheel with the lowest locking torque (brake torque) due to traction control is taken into account for determining the vehicle reference speed $v_{ref}$. To approach the vehicle reference speed to the actual conditions, a negative pressure gradient can be increased based on the assumption that with four slipping wheels the previously determined vehicle reference speed was too high by a defined degree.

The invention claimed is:

1. Method for traction control of slipping wheels of at least one driving axle, the wheels of the at least one driving axle are driven by way of an open differential gear and can be interlocked by braking intervention to a predeterminable degree for effecting a differential lock function, the method comprising the steps of:
   sensing a wheel slip of the wheels;
   comparing a sensed wheel slip variation with predetermined wheel slip patterns for detecting and monitoring a current driving condition;
   performing a braking intervention effecting the differential lock function when the sensed wheel slip variation is coincident with at least one predetermined wheel slip pattern;
   wherein the defined braking intervention includes an adaptive pressure reduction gradient or an adaptive pressure increase gradient is calculated on each individual wheel in dependence on the detected wheel slip pattern, and in that a pressure reduction or a pressure increase is realized by adapting pulse-pause valve actuation sequences; and
   wherein a pause between two pressure reduction pulses is determined as a function of a vehicle reference speed, the wheel slip and a constant base quantity according to the relation $$\Delta T = T_B - k_1 * v_{ref} + k_2 * \lambda_{fil}$$

where
   $T_B$: base quantity
   $k_1, k_2$ amplification factors
   $v_{ref}$: vehicle reference speed
   $\lambda_{fil}$: wheel slip (filtered).

2. Method as claimed in claim 1,
   wherein wheel slip of the wheels is monitored for determining the pause as a subtractive component, and in that a progression or degression of a counter is executed in dependence on the wheel slip of the wheels according to the condition $$k_3 * Stab_{counter}$$

where
   $k_3$ amplification factor
   $Stab_{counter}$ counter for monitoring the wheel slip.

3. Method as claimed in claim 1,
   wherein a component describing a torque difference between a current axle torque and a filtered axle torque is subtractively taken into account according to the condition $$k_4 * \Delta ActTq$$

where
   $\Delta ActTq = ActTq_{fil} - ActTq$ and
   $k_4$: amplification factor
   $ActTq_{fil}$: axle torque (filtered)
   $ActTq$: axle torque (current).

4. Method as claimed in claim 1,
   wherein an engine speed and an engine speed variation are subtractively taken into account according to the condition $$k_5[k_p * (N_{nom} - N) + k_d * \Delta N]$$

where
   $k_5, k_p, k_d$: amplification factors
   $N_{nom}$: nominal engine speed
   $N$: actual engine speed
   $\Delta N$: engine speed variation.

5. Method as claimed in claim 1,
   further comprising providing an electronic controller based on a controller model with linear components (P-components) and integral components (I-components).

6. Method as claimed in claim 4,
   wherein a amplification factors ($k_{1-5}$, $k_p$, $k_d$) are determined in dependence on the detected vehicle driving condition.

7. Method as claimed in claim 1,
   wherein a control threshold is lowered after detection of a driving condition with traction slip.

8. Method as claimed in claim 1,
   wherein the differential lock function is rendered plausible based on the vehicle reference speed and based on a cornering detection, and in that the differential lock function is deactivated in the event of unplausibility.

9. Method as claimed in claim 1,
wherein the differential lock function is deactivated when a driving condition is detected where all wheels exhibit a low coefficient of friction or when cornering is considered to prevail.

10. Method as claimed in claim 9,
wherein a traction control strategy is provided on the basis of wheel-individual slip values in addition to the traction control strategy on the basis of identified driving conditions, and in that the control takes place on the basis of wheel-individual slip values when the differential lock function is deactivated.

11. Method as claimed in claim 1,
wherein rotational data of traction-controlled driving wheels is not taken into account for determining the vehicle reference speed, and in that when a traction control intervention is detected at all wheels, the driving wheel with the lowest braking torque due to traction control is taken into account for determining the vehicle reference speed.

12. Method as claimed in claim 5,
wherein the controller model further includes differential components (D-component, delay elements).

13. Method as claimed in claim 10,
wherein control takes place on the basis of wheel-individual slip values when a driving condition is detected where all wheels adopt a low coefficient of friction.

* * * * *